United States Patent [19]

Reec

[11] Patent Number: 5,395,637
[45] Date of Patent: Mar. 7, 1995

[54] PROCESS FOR PREPARING DOUGH AND IMPROVED PRODUCT

[75] Inventor: Peter Reec, Hameln, Germany

[73] Assignee: A. Stephan U. Soehne GmbH & Co., Hameln, Germany

[21] Appl. No.: 810,419

[22] Filed: Dec. 20, 1991

[30] Foreign Application Priority Data

Nov. 21, 1991 [DE] Germany ............. 41 37 161.5

[51] Int. Cl.$^6$ .................. A23L 1/164; A21D 13/00; A21D 13/04
[52] U.S. Cl. ..................... 426/549; 426/439; 426/560
[58] Field of Search ............. 426/549, 560, 439

[56] References Cited

U.S. PATENT DOCUMENTS

| | | |
|---|---|---|
| Re. 26,263 | 9/1967 | Madrazo et al. . |
| 115,947 | 6/1871 | Fitts . |
| 173,211 | 2/1876 | Chichester . |
| 184,837 | 1/1876 | Chichester . |
| D. 294,448 | 3/1988 | Otto . |
| D. 312,188 | 11/1990 | Otto . |
| 1,035,842 | 8/1912 | Anderson . |
| 1,920,107 | 1/1927 | Richardson . |
| 2,916,378 | 12/1959 | Kunce .............. 99/80 |
| 3,046,139 | 7/1962 | Gould .............. 99/93 |
| 3,369,908 | 2/1968 | Gonzalez et al. . |
| 3,404,986 | 10/1968 | Wimmer et al. .......... 99/93 |
| 3,687,685 | 8/1972 | Rubio .............. 99/80 R |
| 3,690,893 | 9/1972 | Rubio .............. 99/80 R |
| 3,694,224 | 9/1972 | Rubio .............. 99/80 R |
| 3,743,192 | 7/1973 | Otto et al. . |
| 4,081,570 | 3/1978 | Otto et al. . |
| 4,189,504 | 2/1980 | Jimenez . |
| 4,205,094 | 5/1980 | Baird . |
| 4,234,614 | 11/1980 | Hart . |
| 4,299,857 | 11/1981 | Velasco . |
| 4,335,649 | 6/1982 | Velasco . |
| 4,614,665 | 9/1986 | Furuya . |
| 4,623,548 | 11/1986 | Willard . |
| 4,623,550 | 11/1986 | Willard . |
| 4,640,843 | 2/1987 | Matuszak et al. ............. 426/560 |
| 4,650,337 | 3/1987 | Otto . |
| 4,737,371 | 4/1988 | Bookwalter ............. 426/462 |
| 4,756,920 | 7/1988 | Willard . |
| 4,769,253 | 9/1988 | Willard . |
| 4,770,891 | 9/1988 | Willard . |
| 4,861,609 | 8/1989 | Willard et al. . |
| 4,863,278 | 9/1989 | Otto . |
| 4,876,101 | 10/1989 | Willard . |
| 4,878,627 | 11/1989 | Otto . |
| 4,955,724 | 9/1990 | Otto . |

FOREIGN PATENT DOCUMENTS 1041932 9/1966 United Kingdom .

OTHER PUBLICATIONS

Derwent Publications Ltd., London, GB; AN 90-045206 & AU-D-3 676 289, Jan. 4, 1990.

*Primary Examiner*—Donald E. Czaja
*Assistant Examiner*—Mary S. Mims
*Attorney, Agent, or Firm*—Foley & Lardner

[57] ABSTRACT

A process for preparing dough, in particular a corn dough, for the preparation of snack foods such as, for example, corn chips, tortillas, taco shells or the like, in which ground cereals are mixed with water to form a mixture, the mixture is heated and subsequently cooled. The mixture is heated only to a temperature slightly above the gelatinization temperature of the cereal starch, and the mixture is cooled as early as after only partial gelatinization of the cereal starch.

19 Claims, No Drawings

PROCESS FOR PREPARING DOUGH AND IMPROVED PRODUCT

BACKGROUND OF THE INVENTION

1. Field of the Invention

The present invention relates to a process for preparing dough, in particular, a corn dough, for use in the preparation of snack foods such as, for example, corn chips, tortillas, taco shells or the like, in which ground cereals are mixed with water, the mixture is heated and subsequently cooled. The invention also relates to an improved corn dough product produced by the process.

2. Description of the Related Art

In known processes for the preparation of a corn dough, a corn mixture is heated to more than 70° C., preferably up to 90° C. This heating step is followed by a period of holding time to allow the mixture to gelatinize and swell, after which the mixture is rapidly cooled to approximately 66° C. to terminate the cooking operation. This is followed by further, slightly slower cooling to temperatures of from 35° C. to 43° C. During the entire cooling operation, moisture is drawn off.

It is impossible for the CORN MASA (raw corn dough) prepared by this known process to be further processed on conventional rollers for punching out the products to give, for example, corn chips, tortillas or the like.

The only possibility is to use special rolling out equipment used in the cookie-manufacturing industry with which a sticky product can be handled.

SUMMARY OF THE INVENTION

One object of the present invention is to improve upon the conventional process described above.

Another object of the invention is to provide an improved corn dough product.

According to the present invention, these objects are achieved by heating the mixture only to a temperature slightly above the gelatinization temperature of the cereal starch and initiating the cooling of the mixture as early as after only partial gelatinization of the cereal starch.

The present invention is based on the recognition that the disadvantages of the prior art processes essentially reside in the fact that a very high proportion of the cereal starch has gelatinized as a consequence of the starting mixture being heated for a comparatively long time at a high temperature far above the actual gelatinization temperature.

According to the invention, the maximum temperature at which the starting mixture is heated during the preparation of corn dough is limited to 70° C.; preferably heating is only carried out to 58° C. Gelatinization of corn starch sets in at approximately 50° C. Experiments have shown that at a temperature of approximately 58° C., an adequate proportion of corn starch has gelatinized, whereas exceeding a temperature of 70° C. results in too high a proportion of the starch becoming gelatinized and thus becoming a sticky corn mixture.

It is possible, in principle, to process various types of cereals and mixtures thereof according to the present novel process. Corn, however, is preferably used, and, in the most preferred embodiment, it is ground to a degree of fineness which is produced in conventional stone mills. Accordingly, the ground corn is to be used in a mixture of fine flour and particles of up to 2 mm in diameter. The correct distribution is important for the requisite water absorption and for the displacement of the water by oil during the deep-frying operation at a later stage. Use is preferably made of a corn blend which contains a lower proportion of the corn pericarp layer but a higher starch content. In a preferred process, the entire recipe amount of water is added to the starting mixture. In principle, however, it is also possible to add only part of the recipe amount of water to the starting mixture and to add the remaining amount of recipe water as late as in the cooling phase.

For the chemical reaction, it is expedient to add lime to the starting mixture, preferably in the form of calcium hydroxide and in an amount such that the prepared corn mixture has a pH of approximately 9.0 to 11.0. The flavor of the finished product is also affected favorably by the added lime.

Mixing of the starting ingredients to give a homogeneous mixture (mixing phase) is carried out at room temperature and preferably by means of mixing equipment rotating at high speed over a period of less than about 1 minute. This mixing phase can be followed by a holding time (first holding time) to ensure that the corn absorbs the water and reacts with the lime. However, experiments have shown that this holding time can also be dispensed with if necessary.

According to the invention it is advantageous for the heating of the mixture to be effected predominantly by frictional heat introduced into the mixture via the mixing equipment. For this purpose, use is preferably made of mixing equipment rotating at high speeds with broad surfaces. This equipment, by means of friction created in the mixture, brings the homogeneous mixture to an end temperature of preferably about 58° C. In contrast to heating the mixture by direct introduction of steam into it, which is also possible according to the invention, heating the mixture by frictional heat alone has the advantage that the moisture content of the mixture remains unchanged and constant, and uniform heating is achieved.

In principle, combinations of these and other heating methods can also be employed such as, for example, the use of a heated bowl with double walls, microwave heating, or the like. An essential feature of all heating methods, however, is that gelatinization of the starch, which sets in at approximately 50° C., is terminated in time for a corn mixture of a particular dough texture having various desired degrees of gelatinization to be produced depending on the finished product that is desired.

With certain methods, it was found to be advantageous to provide a holding time of approximately 1 minute after reaching the end temperature of, for example, 58° C., during which holding time the heated mixture remains stationary and additional heating is switched off. In this manner, an even temperature throughout the mixture with uniform gelatinization can be achieved.

Cooling is carried out to a temperature below the temperature at which gelatinization of the starch sets in, i.e., to a temperature <50° C., preferably to about 43° C. According to the invention, this cooling is to be effected rapidly, preferably over a period of up to about 3.5 minutes. The cooling interrupts the gelling. In this context, cooling can be effected, for example, by applying a vacuum using a vacuum-condenser system.

During the cooling phase, the impact of the rotating mixing equipment on the mixture must not be too strong. This is to avoid producing a sticky corn mixture. It is therefore expedient to conduct only intermittent mixing with the mixing equipment rotating, for example, only for approximately 3 seconds at 30 second-intervals. However, it is also possible to allow the mixing equipment to rotate continuously at a low speed.

If, at the start of the process, only part of the recipe amount of water is added, the remaining amount of water can be added during the cooling phase to produce a cooling effect. In order to incorporate the remaining amount of water added into the mixture, it is necessary to mix the mixture and the added volume of water. For this purpose, the mixing equipment can rotate for periods up to approximately half a minute at high speed.

A major advantage of the process according to the present invention resides in the fact that the entire process, including automatic discharge of the corn mixture, can be carried out fully automatically in a mixing bowl. Uniform texture and consistent flavor of the corn mixture is thereby guaranteed.

At the end of the process of the present invention, the resulting corn mixture is a cold, dense, slightly cohesive but not sticky dough which can be easily processed with a machine, has a moisture content of approximately 46% to 52% and a pH of approximately 9.0 to 11.0.

Advantageously, the process according to the present invention can be carried out using a UMM/SK 44 E Pilot-type machine or with a larger Combicut machine, both by Messrs. Stephan. These machines have broad mixing blades which, in their operational phase, can attain speeds of rotation of at least 1,000 to 3,600 rpm. Furthermore, these machines are equipped with a circulator which scrapes the walls of the bowl, usually at about 26 rpm.

With a machine of this type by Messrs. Stephan, the corn masa can be prepared, for example, by the following process.

EXAMPLE

Constituents of the recipe are 9 kg of specially ground and blended corn, 7.2 kg of water and 30 g of calcium hydroxide. These constituents are mixed at a room temperature of approximately 23° C. for 60 seconds with mixing equipment rotating at 1,750 rpm (and, if appropriate, additionally with a circulator rotating at the same time at 26 rpm) to produce a homogeneous mixture. A holding time of 5 to 10 minutes follows in which no mixing occurs. Thereafter, the mixture is heated to 58° C. by frictional heat alone which is introduced into the mixture over a period of approximately 8 minutes by the mixing equipment rotating at 1,750 rpm. Alternatively, heating can be effected by direct introduction of dry steam into the mixture to be heated at a pressure of 2 bar. After the mixture has reached the desired end temperature of 58° C., a second holding time of approximately 1 minute follows during which time neither mixing nor further heating of the mixture occurs. Subsequently, rapid cooling of the mixture from 58° C. down to 43° C. follows over a period of approximately 3.5 minutes by means of vacuum-condenser cooling. During this cooling phase the mixing equipment only rotates intermittently, for example, each time for 3 seconds at 30 second-intervals and at a rate of 1,750 rpm. With appropriate setting of the machine, however, it is also possible for the mixing equipment to rotate continuously at a crawl speed of approximately 55 rpm. If, however, during this cooling phase a remaining amount of water is added, an additional mixing stage is necessary, and the equipment is rotated for approximately 30 seconds at a rate of 1,750 rpm.

The process according to the present invention can be carried out in particular with machines from Messrs. A. Stephan u. Söhne GmbH & Co., and especially with Combicut machines with a vacuum facility and a condenser; the drum capacity of these machines can be from 200 l to 1,500 l.

The progression of the procedure initiated by the process according to the invention can be controlled very precisely by simple means, since the progressing gelatinization and/or swelling process is directly proportional to the output of the main motor. Control can thus be effected in a simple manner by means of corresponding output measurement instruments which are commercially available.

What is claimed is:

1. A process for preparing dough, used in the preparation of snack foods, comprising:
   mixing ground cereals with water to form a mixture;
   heating the mixture; and
   subsequently cooling the mixture in a cooling phase, wherein said heating step comprises heating the mixture to a temperature of between about 50° C. and 70° C. and said cooling step comprises cooling the mixture as early as after only partial gelatinization of the cereal starch.

2. The process as claimed in claim 1, wherein the mixture is heated to a temperature of about 58° C.

3. The process as claimed in claim 1, wherein the ground cereal and water is mixed at room temperature.

4. The process as claimed in claim 1, further comprising the step of adding lime to the starting mixture in an amount such that the dough has a pH of approximately 9.0 to 11.0.

5. The process as claimed in claim 1, wherein the heating of the mixture is conducted by frictional heat of the mixing equipment.

6. The process as claimed in claim 1, wherein the heating of the mixture is conducted by direct introduction of steam.

7. The process as claimed in claim 1, further comprising the step of providing a holding time after mixing the ground cereals to form a mixture.

8. The process as claimed in claim 7, further comprising the step of providing a second holding time after heating the mixture to the gelatinization temperature.

9. The process as claimed in claim 1, wherein said cooling step comprises cooling the mixture to a temperature less than about 50° C.

10. The process as claimed in claim 1, wherein said cooling step comprises applying a vacuum condenser to the mixture.

11. The process as claimed in claim 1, further comprising the step of mixing the mixture during the cooling step by means of rotating mixing equipment.

12. The process as claimed in claim 11, comprising intermittently mixing the mixture during the cooling step.

13. The process as claimed in claim 1, wherein only part of the recipe amount of water is added to the ground cereals, and the remaining amount of recipe water is added in the cooling step.

14. The process for preparing a corn dough as claimed in claim 1, wherein the ground cereal is a mixture of fine flour and particles of up to 2 mm in diameter.

15. The process as claimed in claim 14, wherein said mixing step comprises mixing the ground cereal by means of mixing equipment rotating at high speeds for a period of time of less than about 1 minute.

16. The process as claimed in claim 7, wherein the first holding time is approximately 5 to 10 minutes.

17. The process as claimed in claim 8, wherein the second holding time is up to 5 about minutes.

18. The process as claimed in claim 17, wherein the second holding time is up to about 5 minutes.

19. The product made according to the process as claimed in claim 1, which comprises a cold, dense, slightly cohesive but not sticky dough which can be easily processed with a machine, has a moisture content of approximately 46% to 52% and a pH of approximately 9.0 to 11.0.

* * * * *